(12) United States Patent
Park

(10) Patent No.: US 10,223,678 B2
(45) Date of Patent: Mar. 5, 2019

(54) TOUCH BASED ASSET TRANSACTION

(71) Applicant: KT Corporation, Seongnam-si (KR)

(72) Inventor: Jong-han Park, Seoul (KR)

(73) Assignee: KT CORPORATION, Seongnam-si (KR)

( * ) Notice: Subject to any disclaimer, the term of this patent is extended or adjusted under 35 U.S.C. 154(b) by 131 days.

(21) Appl. No.: 13/954,020

(22) Filed: Jul. 30, 2013

(65) Prior Publication Data

US 2014/0040128 A1 Feb. 6, 2014

(30) Foreign Application Priority Data

Jul. 31, 2012 (KR) .................. 10-2012-0084081

(51) Int. Cl.
| | | |
|---|---|---|
| G06Q 40/00 | (2012.01) | |
| G06Q 20/10 | (2012.01) | |
| G07F 19/00 | (2006.01) | |
| G06Q 20/22 | (2012.01) | |
| G07F 9/02 | (2006.01) | |
| G06F 3/0488 | (2013.01) | |

(52) U.S. Cl.
CPC ......... *G06Q 20/108* (2013.01); *G06F 3/0488* (2013.01); *G06Q 20/227* (2013.01); *G07F 9/023* (2013.01); *G07F 19/206* (2013.01)

(58) Field of Classification Search
CPC ...... G06F 3/0486; G06Q 40/00; G06Q 20/08; G06Q 30/06; G06Q 30/0601; G06Q 20/40; G06Q 30/0267
USPC .......................................................... 705/39
See application file for complete search history.

(56) References Cited

U.S. PATENT DOCUMENTS

| | | | | |
|---|---|---|---|---|
| 8,220,707 | B1* | 7/2012 | Block et al. ................... | 235/379 |
| 8,255,323 | B1* | 8/2012 | Casey et al. .................... | 705/39 |
| 2001/0042042 | A1* | 11/2001 | Stokes .................... | G06Q 20/04 705/42 |
| 2004/0039701 | A1* | 2/2004 | Nakamura ............. | G06Q 20/04 705/42 |
| 2008/0006685 | A1* | 1/2008 | Rackley, III .......... | G06Q 20/10 235/379 |
| 2008/0046362 | A1* | 2/2008 | Easterly ................. | G06Q 20/04 705/40 |
| 2009/0288012 | A1* | 11/2009 | Hertel .................... | G06Q 20/02 715/738 |
| 2011/0184865 | A1* | 7/2011 | Mon .................. | G06Q 20/1085 705/43 |

(Continued)

FOREIGN PATENT DOCUMENTS

KR    10-0481439 B1    4/2005

*Primary Examiner* — Kirsten S Apple
*Assistant Examiner* — Mike Anderson
(74) *Attorney, Agent, or Firm* — Brundidge & Stanger, P.C.

(57) ABSTRACT

In one example embodiment, an end device includes a touch screen configured to: display a plurality of icons that are respectively associated with a plurality of asset transaction entities, and receive a touch input with respect to at least two icons among the plurality of icons; a processor configured to translate the touch input into an asset transaction request that initiates execution of an asset transaction between at least two asset transaction entities among the plurality of asset transaction entities; and a transmitter configured to transmit the asset transaction request to a service provider.

9 Claims, 9 Drawing Sheets

(56) References Cited

U.S. PATENT DOCUMENTS

| | | | |
|---|---|---|---|
| 2011/0246316 A1* | 10/2011 | Cincera | G06Q 20/1085 705/17 |
| 2011/0276478 A1* | 11/2011 | Hirson | G06Q 20/023 705/40 |
| 2012/0005577 A1* | 1/2012 | Chakra | G06F 3/0486 715/702 |
| 2012/0239417 A1* | 9/2012 | Pourfallah | G06Q 50/22 705/2 |

* cited by examiner

TOUCH BASED ASSET TRANSACTION

TECHNICAL FIELD

The embodiments described herein pertain generally to schemes for executing asset transactions by touching displayed icons representing asset transaction entities.

BACKGROUND

The advent of a mobile banking has allowed banking customers to receive funds, transfer funds, pay bills, purchase tangible and/or intangible goods using a mobile device, i.e., without cash or a credit/debit card on hand. This enables "cashless" financial transactions in which no physical currency is actually exchanged.

SUMMARY

In one example embodiment, an end device includes a touch screen configured to display a plurality of icons that are respectively associated with a plurality of asset transaction entities, and to receive a touch input with respect to at least two icons among the plurality of icons; a processor configured to translate the touch input into an asset transaction request that initiates execution of an asset transaction between at least two of the plurality of asset transaction entities; and a transmitter configured to transmit the asset transaction request to a service provider.

In another example embodiment, a method performed under control of an end device includes displaying a plurality of icons that are associated with a plurality of asset transaction entities; receiving a touch input with respect to at least two icons among the plurality of icons; translating the touch input into an asset transaction request that initiates execution of an asset transaction between at least two of the plurality of asset transaction entities; and transmitting the asset transaction request to a service provider.

In yet another example embodiment, a computer-readable storage medium stores thereon computer-executable instructions that, in response to execution, cause an end device to perform operations including translating a touch input with respect to at least two icons into an asset transaction request that initiates execution of an asset transaction between at least two asset transaction entities that are associated with the at least two icons; and transmitting the asset transaction request to a service provider.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
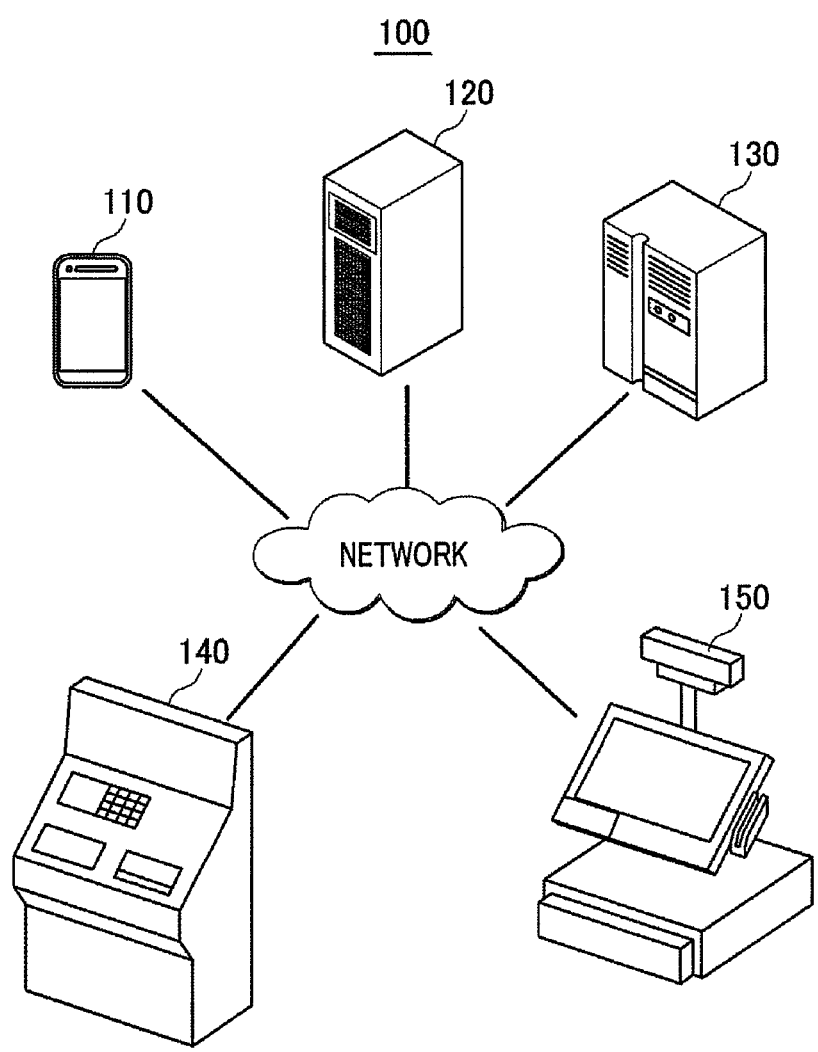
FIG. 1 shows an example system configuration in which one or more embodiments of touch based asset transactions may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which one or more embodiments of touch based asset transactions may be implemented. As depicted in FIG. 1, system configuration 100 includes, at least, an end device 110, a service provider 120, an asset transaction server 130, an automated teller machine (ATM) 140, and a point-of-sale terminal 150. End device 110, service provider 120, asset transaction server 130, automated teller machine 140 and point-of-sale terminal 150 may be connected to each other via a wireless network.

End device 110 may refer to at least one of a mobile phone, a portable device, a notebook, or even a personal computer or a personal communication terminal, such as PCS (Personal Communication System), GMS (Global System for Mobile communications), PDC (Personal Digital Cellular), PDA (Personal Digital Assistant), IMT (International Mobile Telecommunication)-2000. The device may even be a CDMA (Code Division Multiple Access)-2000, W-CDMA (W-Code Division Multiple Access), or Wibro (Wireless Broadband Internet) terminal.

Service provider 120 may refer to an organization or entity that provides some type of communication service, data storage service, data or information processing service, content service, or any combination thereof to business customers or consumers. Service provider 120 may host one or more servers or other processing apparatuses that may be configured to receive one or more asset transaction requests from end device 110, to transmit the received one or more asset transaction requests to asset transaction server 130, and to provide end device 110 with one or more expressions of at least one result of an asset transaction which may be executed by asset transaction server 130. Non-limiting example of service provider 120 may include an Internet service provider, i.e., ISP; application service provider, i.e., ASP; storage service provider, i.e., SSP; and television service provider, i.e., cable TV, DSL and DBS.

Asset transaction server 130 may refer to an organization or entity that provides some type of communication service, data storage service, data or information processing service, content service, or any combination thereof to business customers or consumers. Asset transaction server 130 may host one or more servers or other processing apparatuses that may be configured to receive the one or more asset transaction requests from service provider 120, and to provide service provider 120 with the one or more expressions of at least one result of the asset transaction in response to the received asset transaction requests. Non-limiting example of asset transaction server 130 may include a financial service provider, a banking service provider, or a credit card service provider.

Automated teller machine 140 may refer to an apparatus or device that is communicatively coupled to end device 110, and enables users of end device 110 to perform asset transactions without the need for a cashier, human clerk, or bank teller. Automated teller machine 140 further enables the users to use end device 110 to access their bank accounts in order to make cash withdrawals, credit or debit card cash advances, and/or to check their account balances as well as purchase pre-paid mobile phone credit.

Point-of-sale terminal 150 may refer to an apparatus or device that is communicatively coupled to end device 110 and provides one or more payment services to end device 110 by using at least, a credit card, a debit card, and/or funds stored in bank accounts via asset transaction server 130.

In some embodiments, end device 110 may be configured to perform an authenticating process with regard to service provider 120 so that a secured network channel between end device 110 and service provider 120 may be generated and authenticated. By way of example, but not limitation, end device 110 and service provider 120 may perform a universal subscriber identity module (USIM) authentication. End device 110 may be configured to transmit a USIM identifier and password or a secret key to service provider 120; and service provider 120 may authenticate end device 110 based on the USIM identifier and password/secret key so that the secured network channel between is generated.

End device 110 may be further configured to receive asset information regarding multiple asset transaction entities from service provider 120, via the secured network channel that is generated by the authenticating process. By way of example, but not limitation, the multiple asset transaction entities may refer to any type of entity that is usable for an online asset transaction, such as at least one of a bank account, a credit card account, a debit card account, a reward points account, a telephone payment service, etc. Non-limiting examples of the asset information regarding the multiple asset transaction entities may include a user's bank account number, credit card number, debit card number, a reward points account number, or a telephone number assigned to end device 110 which is enabled to perform the telephone payment service.

Service provider 120 may be configured to check (i.e., confirm) with asset transaction server 130 which of the multiple asset transaction entities associated with a user of end device 110 is available. Then, service provider 120 may be configured to transmit, to end device 110, the asset information regarding the one or more available asset transaction entities. By way of example, but not limitation, the asset information regarding one or more available asset transaction entities may be predefined and pre-registered with regard to asset transaction server 130 by an owner and/or entity that exercises control over end device 110.

End device 110 may be further configured to generate multiple icons that are associated with the multiple asset transaction entities based on the received asset information. Each of the multiple icons may be associated with, and represent, a respective one of the multiple asset transaction entities. By way of example, but not limitation, end device 110 may be configured to generate a bank account icon that is associated with the bank account and the bank account number and a credit card account icon that is associated with the credit card account, etc. Further, by way of example, end device 110 may be still further configured to generate and display thereon the icons by using any well-known graphic schemes or select the each icon from among multiple icons that are previously generated and stored in a memory.

In some embodiments, end device 110 may be configured to read ATM information received from automated teller machine 140 by a reader that is configured or enabled to read information from an electronic tag that may be an identifier of automated teller machine 140. By way of example but not limitation, the ATM information may include identification information of automated teller machine 140, such as a unique identifier or a serial number. Further, the electronic tag may be attached to a surface of automated teller machine 140 or inserted in automated teller machine 140 as an electronic chip. The electronic tag may include at least one of a radio frequency identification (RFID) tag, a near field communication (NFC) tag, a barcode, a quick response code, etc. Further, the reader coupled to end device 110 may include a radio frequency identification reader, a near field communication reader, a barcode reader, a quick response code reader, etc.

End device 110 may be even further configured to read the ATM information regarding automated teller machine 140 via a wireless network between end device 110 and automated teller machine 140. By way of example, but not limitation, the wireless protocol between end device 110 and automated teller machine 140 may refer to at least one of a near field communication (NFC), Bluetooth, or peer to peer (P2P) communication protocol.

In some embodiments, end device 110 may be configured to read point-of-sale terminal information received from point-of-sale terminal 150 by a reader that is configured or enabled to read information from an electronic tag that may be an identifier of point-of-sale terminal 150. By way of example, but not limitation, the point-of-sale terminal information may include identification information of point-of-sale terminal 150, such as a unique identifier or a serial number. Further, the electronic tag may be attached to a surface of point-of-sale terminal 150 or inserted in point-of-sale terminal 150 as an electronic chip.

End device 110 may be further configured to obtain the point-of-sale terminal information regarding point-of-sale terminal 150 via a wireless network between end device 110 and point-of-sale terminal 150, such as at least one of a near field communication (NEC), Bluetooth, or peer to peer (P2P) communication protocol.

Further, end device 110 may be configured to generate, and display thereon, at least one icon that is associated with the asset transaction entities, e.g., automated teller machine 140 or point-of-sale terminal 150, based on the ATM information or point-of-sale terminal information. By way of example, but not limitation, end device 110 may be configured to generate an ATM icon that represents automated teller machine 140 in association with the ATM information and/or generate a point-of-sale icon that represents point-of-sale terminal 150 in association with the point-of-sale terminal information.

In some embodiments, end device 110 may be configured to display the multiple icons on a touch screen that has a touch-sensitive surface coupled to end device 110. By way of example, but not limitation, the touch screen may be implemented by using liquid crystal display (LCD) technology, light emitting diode (LED) technology, or light emitting polymer display (LPD) technology.

End device 110 may be further configured to receive a touch input to the touch screen with respect to at least two icons among the multiple icons, each of which is associated with at least two asset transaction entities. By way of example, but not limitation, end device 110 may receive a touch input that drags one icon to another icon. A user of end device 110 may make the touch input to the touch screen using any suitable object or appendage, such as a stylus, finger, and so forth. End device 110 may recognize the touch input by using one or more multiple touch sensitivity technologies, including but not limited to capacitive, resistive, infrared, and surface acoustic wave technologies, as well as other proximity sensor arrays or other elements for determining one or more points of contact with the touch screen.

End device 110 may be configured to translate parameters of the received touch input into an asset transaction request that initiates execution of an asset transaction between the at least two asset transaction entities that are associated with the at least touched two icons. By way of example, but not limitation, when touch screen 115 of end device 110 receives or detects a touch input that drags a first bank icon, which is associated with a first bank account, to a second bank icon, which is associated with a second bank account, end device 110 may translate parameters of the received or detected touch input into an asset transaction request that initiates a remittance from the first bank account to the second bank account, based on a first bank account number and a second bank account number. When the touch screen of end device 110 receives or detects a touch input, end device 110 may generate the asset transaction request or may select the asset transaction request previously stored in the memory. Then, end device 110 may transmit the asset transaction request to service provider 120 via a wireless network.

End device 110 may be further configured to transmit, to service provider 120, the asset information regarding the multiple asset transaction entities, which include at least one of the bank account number of the bank account, the credit card number, the debit card number, the remaining reward points, the reward points account number, the telephone number assigned to end device 110, the unique identifier of automated teller machine 140, the serial number of automated teller machine 140, the unique identifier of point-of-sale terminal 150, or the serial number of point-of-sale terminal 150.

In some embodiments, end device 110 may be configured to receive an input regarding an amount of money that is requested to be transmitted and received between the at least two asset transaction entities in accordance with the input that is received or detected by the touch screen coupled to end device 110. End device 110 may be further configured to transmit information regarding the amount of money to service provider 120 in addition to the asset transaction request.

Service provider 120 may be configured to request that asset transaction server 130 execute an asset transaction between the at least two asset transaction entities, when service provider 120 receives the asset transaction request, while transmitting the received asset transaction request, the asset information, and the information regarding the amount of money to asset transaction server 130.

Thus, asset transaction server 130 may be further configured to execute an asset transaction between the at least two asset transaction entities in response to the receipt of the asset transaction request based on the asset information regarding the at least two asset transaction entities and the information regarding the amount of money. By way of example, but not limitation, asset transaction server 130 may remit the amount of money from the first bank account to the second bank account, utilizing the bank account number of the first bank account and the bank account number of the second bank account.

Asset transaction server 130 may be configured to notify and transmit a result of the asset transaction executed between the at least two asset transaction entities to service provider 120. Service provider 120 may be configured to transmit one or more expressions of the result of the asset transaction to end device 110, upon receiving the result of the asset transaction. End device 110 may be configured to receive the one or more expressions of the result of the asset transaction and display them on the touch screen coupled to end device 110.

Thus, FIG. 1 shows an example system configuration 100 in which one or more embodiments of touch based asset transaction may be implemented.

Figure 2:
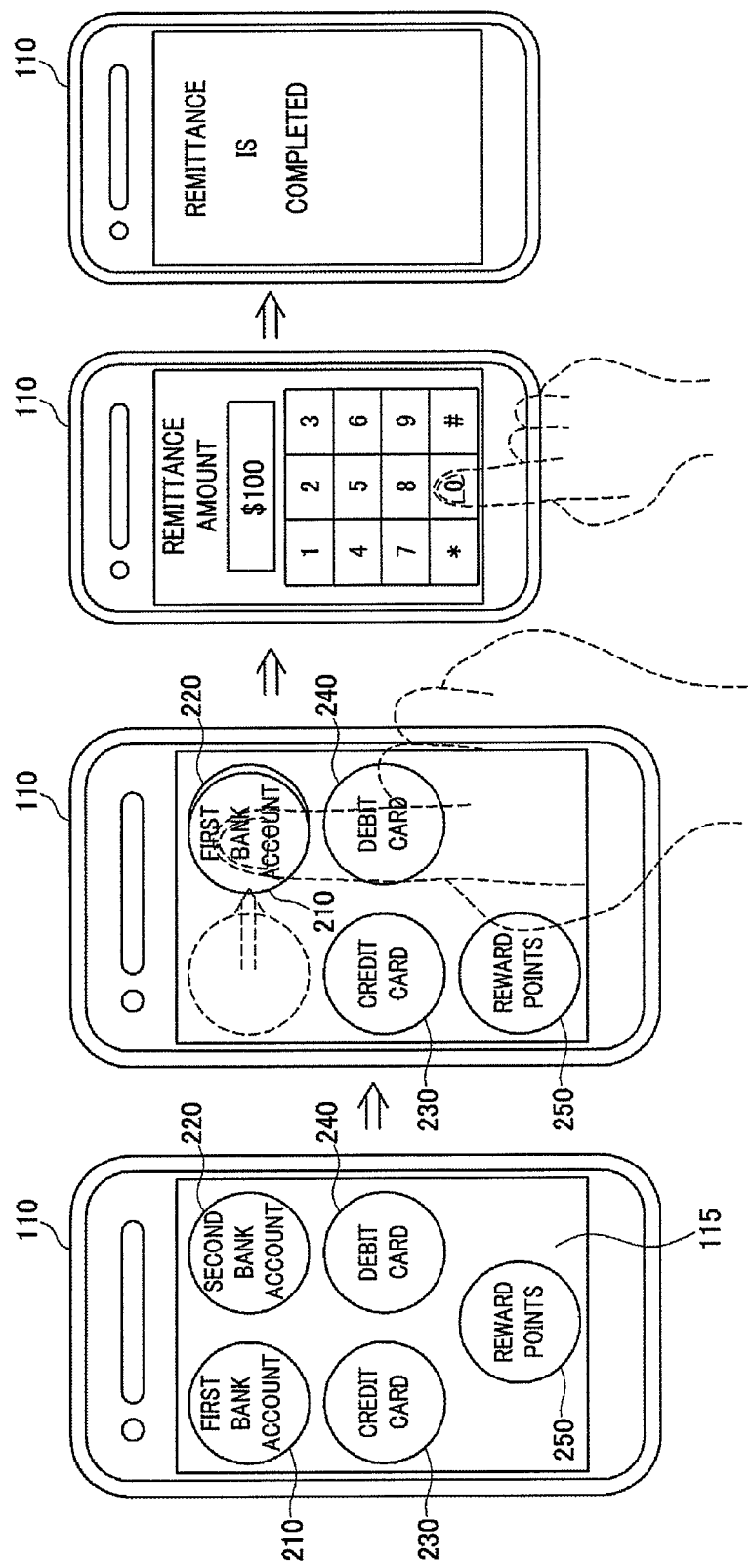
FIG. 2 shows an illustrative example of an end device in which one or more embodiments of touch based asset transaction may be implemented.

FIG. 2 shows an illustrative example of an end device 110, in which one or more embodiments of touch based asset transaction may be implemented. End device 110, which is described above with regard to FIG. 1, may be configured to display multiple icons that are respectively associated with multiple asset transaction entities on a touch screen 115. By way of example, as depicted in FIG. 2, end device 110 may be configured to display a first icon 210 that is associated with a first bank account, a second icon 220 that is associated with a second bank account, a third icon 230 that is associated with a credit card account, a fourth icon 240 that is associated with a debit card account, and a fifth icon 250 that is associated with card reward points. It may be assumed that a secured network channel between end device 110 and service provider 120 is generated and authenticated by an authenticating process such as a universal subscriber identity module (USIM) authentication.

End device 110 may be further configured to receive or detect a touch input to touch screen 115 with respect to at least two icons among the multiple icons. As depicted in FIG. 2, end device 110 may be configured to receive or detect a touch input that drags first icon 210 to second icon 220. By way of example, but not limitation, a user of end device 110 may make the touch input to touch screen 115 using any suitable object or appendage, such as a stylus, finger, and so forth.

End device 110 may be further configured to translate parameters of the received or detected touch input into an asset transaction request that initiates a remittance from the first bank account associated with first icon 210 to the second bank account associated with second icon 220. When end device 110 receives the touch input, end device 110 may generate the asset transaction request or may select the asset transaction request previously stored in a memory. The first bank account may be attributed to the user of end device 110 and the second bank account may be attributed to the user of end device 110 or other person or entity.

End device 110 may be further configured to receive an input regarding an amount of the remittance. By way of example, but not limitation, the user of end device 110 may make or render a touch input to touch screen 115 that indicates the amount of the remittance. Alternatively, information regarding the amount of the remittance may be pre-registered and previously stored in the memory of end device 110 or in a memory of service provider 120.

End device 110 may be further configured to transmit, to service provider 120, the asset transaction request that includes a first bank account number of the first bank account and a second bank account number of the second bank account, via the secured network channel between end device 110 and service provider 120. Further, end device 110 may be configured to transmit, to service provider 120, the received or stored information regarding the amount of the remittance as well as the asset transaction request.

Service provider 120 may be configured to transmit the asset transaction request and to request that asset transaction server 130 remit the amount of money from the first bank account to the second bank account, upon receiving or detecting the asset transaction request. Asset transaction server 130 may be configured to then execute the remittance between the first bank account and the second bank account, in response to the receipt of the asset transaction request, and to transmit a result of the remittance to service provider 120. Service provider 120 may be further configured to transmit one or more expressions of the result of the remittance to end device 110. End device 110 may be configured to receive and display the one or more expressions of the result of the remittance and display them on touch screen 115.

Although end device 110 may receive or detect the touch input that drags first icon 210 to second icon 220, end device 110 may be configured to receive or detect a touch input that drags multiple icons (e.g., first icon 210 and third icon 230) to a single icon (e.g., second icon 220) simultaneously or sequentially. End device 110 may be configured to translate parameters of the received touch input into an asset transaction request that initiates a remittance from the first bank account associated with first icon 210 and the credit card account associated with third icon 230 to the second bank account associated with second icon 220, upon receiving or detecting the touch input that drags first icon 210 and third icon 230 to second icon 220.

Further, although end device 110 is described as receiving or detecting the touch input that drags first icon 210 to second icon 220, end device 110 may be further configured to receive or detect a touch input that clicks or selects first icon 210 and second icon 220 sequentially within a predetermined time interval, e.g., one second. End device 110 may be configured to translate parameters of the received touch input into an asset transaction request that initiates a remittance from the first bank account associated with first icon 210, which may be clicked or selected earlier to the second bank account associated with second icon 220, which may be clicked or selected later, upon receiving the touch input that clicks or selects first icon 210 and second icon 220 sequentially.

Thus, FIG. 2 shows an illustrative example of an end device 110 in which one or more embodiments of touch based asset transaction may be implemented.

Figure 3:
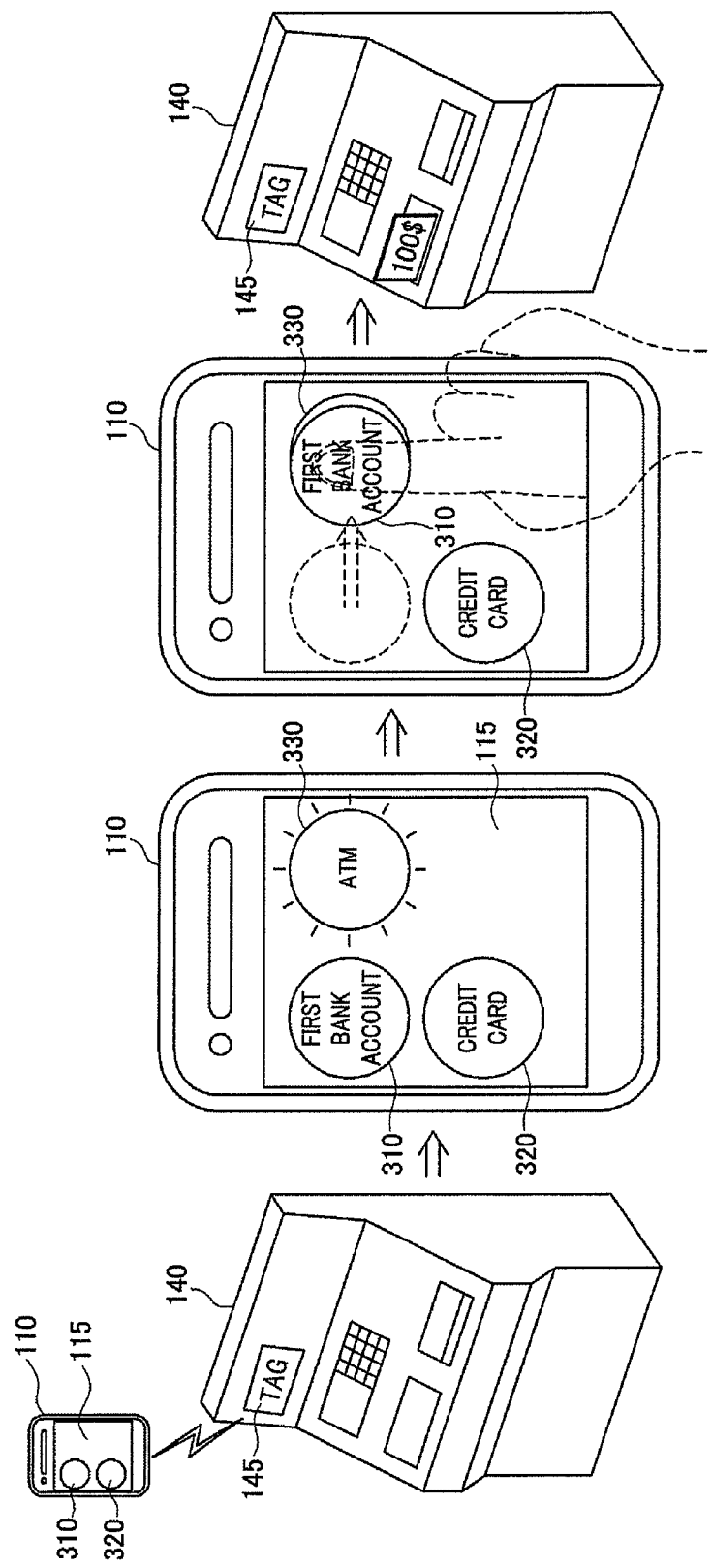
FIG. 3 shows an illustrative example of a system in which one or more embodiments of touch based asset transaction may be implemented.

FIG. 3 shows an illustrative example of a system in which one or more embodiments of touch based asset transaction may be implemented. By way of example, as depicted in FIG. 3, end device 110, described above with regard to FIGS. 1 and 2, may be configured to display a first icon 310 that is associated with a first bank account and a second icon 320 that is associated with a credit card account. It may be assumed that a secured network channel between end device 110 and service provider 120 is generated and authenticated by an authenticating process such as a universal subscriber identity module (USIM) authentication.

In some embodiments, end device 110 may be configured to read ATM information received from automated teller machine 140 by a reader that is enabled to read information from an electronic tag 145. The ATM information may include information that identifies automated teller machine 140, such as a unique identifier or a serial number. As depicted in FIG. 3, electronic tag 145 may be attached to a surface of automated teller machine 140, but alternatively electronic tag 145 may be inserted in automated teller machine 140 as an electronic chip.

By way of example but not limitation, electronic tag 145 may include at least one of a radio frequency identification (RFID) tag, a near field communication (NFC) tag, a barcode, a quick response code, etc. Further, the reader coupled to end device 110 may include a radio frequency identification reader, a near field communication reader, a barcode reader, a quick response code reader, etc.

In some embodiments, end device 110 may be configured to read the ATM information regarding automated teller machine 140, via a wireless network between end device 110 and automated teller machine 140, which may be communicatively coupled to end device 110. By way of example, but not limitation, the wireless protocol between end device 110 and automated teller machine 140 may refer to at least one of a near field communication (NFC), Bluetooth, or peer to peer (P2P) communication protocol.

End device 110 may be configured to generate a third icon 330 that represents automated teller machine 140, based on the read ATM information. By way of example, end device 110 may be configured to generate third icon 330 by using any well-known graphic schemes or select third icon 330 from among multiple icons that are previously generated and stored in a memory. End device 110 may be further configured to display the generated third icon 330 on touch screen 115.

As depicted in FIG. 3, end device 110 may be further configured to receive a touch input to touch screen 115 that drags first icon 310 to third icon 330. By way of example, but not limitation, a user of end device 110 may enter or render the touch input to touch screen 115 using any suitable object or appendage, such as a stylus, finger, and so forth.

End device 110 may be further configured to translate parameters of the received or detected touch input into an asset transaction request that initiates a withdrawal of money stored in the first bank account, which is associated with first icon 310, from automated teller machine 140, which is associated with third icon 330.

End device 110 may be further configured to receive or detect an input regarding an amount of the withdrawal. By way of example, but not limitation, the user of end device 110 may enter or render a touch input to touch screen 115 regarding the amount of the withdrawal by using any suitable object or appendage, such as a stylus, finger, and so forth.

End device 110 may be further configured to transmit, to service provider 120, the asset transaction request that includes a first bank account number of the first bank account and the read ATM information, such as the unique identifier of automated teller machine 140 or the serial number of automated teller machine 140, via the secured network channel between end device 110 and service provider 120. Further, end device 110 may be configured to transmit, to service provider 120, the received or detected input regarding the amount of the withdrawal as well as the asset transaction request.

When service provider 120 receives or detects the asset transaction request, service provider 120 may be configured to transmit the asset transaction request to asset transaction server 130 and to request that asset transaction server 130 execute a withdrawal of the amount of money stored in the first bank account from automated teller machine 140. Asset transaction server 130 may be configured to control automated teller machine 140 that is communicatively coupled to asset transaction server 130 to remit the amount of money, upon receipt of the asset transaction request. Asset transaction server 130 may be further configured to transmit a result of the withdrawal to service provider 120. Service provider 120 may be further configured to transmit one or more expressions of the result of the withdrawal to end device 110. End device 110 may be further configured to receive and display the one or more expressions of the result of the withdrawal on touch screen 115.

Thus, FIG. 3 shows an illustrative example of a system in which one or more embodiments of touch based asset transaction may be implemented.

Figure 4:
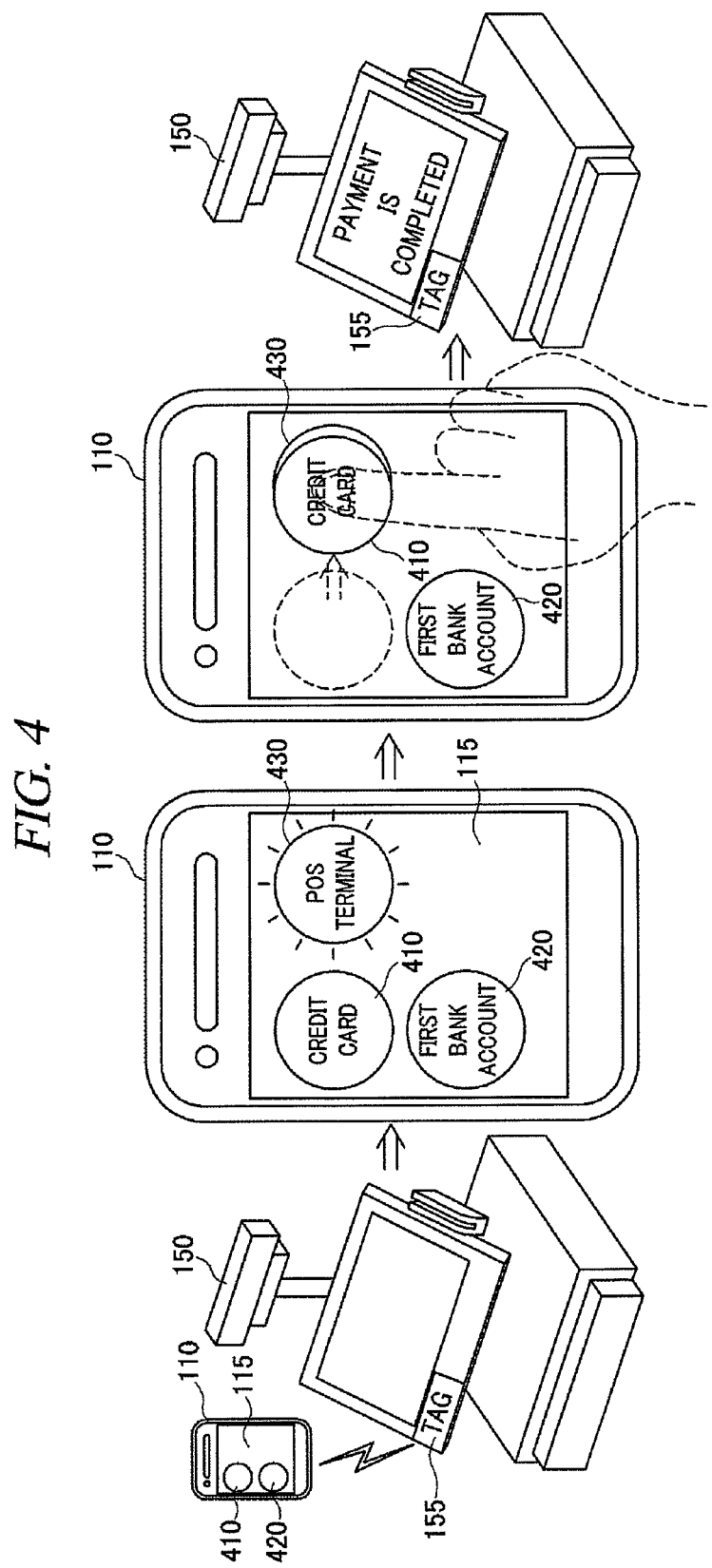
FIG. 4 shows yet another illustrative example of a system in which one or more embodiments of touch based asset transaction may be implemented.

FIG. 4 shows yet another illustrative example of a system in which one or more embodiments of touch based asset transaction may be implemented. By way of example, as depicted in FIG. 4, end device 110, which is described in accordance with FIGS. 1-3, may be configured to display a first icon 410, which is associated with a credit card account, and a second icon 320, which is associated with a first bank account. It may be assumed that a secured network channel between end device 110 and service provider 120 is generated and authenticated by an authenticating process such as a universal subscriber identity module (USIM) authentication.

In some embodiments, end device 110 may be configured to read point-of-sale terminal information received from point-of-sale terminal 150 by a reader that is configured to read information from an electronic tag 155. The point-of-sale terminal information may include information that identifies point-of-sale terminal 150, such as a unique identifier or a serial number. As depicted in FIG. 4, electronic tag 155 may be attached to a surface of point-of-sale terminal 150, but alternatively electronic tag 155 may be inserted in point-of-sale terminal 150 as an electronic chip.

By way of example, but not limitation, electronic tag 155 may include at least one of a radio frequency identification (RFID) tag, a near field communication (NFC) tag, a barcode, a quick response code, etc. Further, the reader which is coupled to end device 110 may include a radio frequency identification reader, a near field communication reader, a barcode reader, a quick response code reader, etc.

In some embodiments, end device 110 may be configured to read the point-of-sale terminal information regarding point-of-sale terminal 150 via a wireless network between end device 110 and point-of-sale terminal 150, which may be communicatively coupled to end device 110. By way of example, but not limitation, the wireless protocol between end device 110 and point-of-sale terminal 150 may refer to at least one of a near field communication (NFC), Bluetooth, or peer to peer (P2P) communication protocol.

End device 110 may be configured to generate a third icon 430 that is associated with point-of-sale terminal 150 to represent point-of-sale terminal 150, based on the received point-of-sale terminal information. By way of example, but not limitation, end device 110 may be configured to generate third icon 430 by using any well-known graphic schemes or select third icon 430 from among multiple icons that are previously generated and stored in a memory. End device 110 may be further configured to display the generated third icon 430 on touch screen 115.

As depicted in FIG. 4, end device 110 may be further configured to receive or detect a touch input to touch screen 115 that drags first icon 410 to third icon 430. By way of example, but not limitation, a user of end device 110 may make or render the touch input to touch screen 115 using any suitable object or appendage, such as a stylus, finger, and so forth.

End device 110 may be further configured to translate parameters of the received touch input into an asset transaction request that initiates a payment to point-of-sale terminal 150, which is associated with third icon 430 from the credit card account, which is associated with first icon 410.

End device 110 may be further configured to receive an input regarding a payment amount. By way of example, but not limitation, the user of end device 110 may make or render a touch input to touch screen 115 regarding the payment amount by using any suitable object or appendage, such as a stylus, finger, and so forth.

End device 110 may be further configured to transmit, to service provider 120, the asset transaction request that includes the read point-of-sale terminal information, a credit card number via the secured network channel between end device 110 and service provider 120. Further, end device 110 may be configured to transmit, to service provider 120, the received input regarding the payment amount as well as the asset transaction request. In some embodiments, service provider 120 may be configured to receive information regarding the payment amount from point-of-sale terminal 150, via a wireless network between service provider 120 and point-of-sale terminal 150.

Service provider 120 may be configured to transmit the asset transaction request to asset transaction server 130 and to request for asset transaction server 130 to execute a payment to point-of-sale terminal 150 from the credit card account, upon receiving the asset transaction request. Asset transaction server 130 may be configured to execute a payment to point-of-sale terminal 150 with the credit card account, upon receiving the asset transaction request. Asset transaction server 130 may be configured to then transmit a result of the payment to service provider 120 and point-of-sale terminal 150. Service provider 120 may be further configured to transmit one or more expressions of the result of the payment to end device 110. End device 110 may be further configured to receive or detect, as well as to display, the one or more expressions of the result of the payment on touch screen 115.

Although end device 110 may receive or detect the touch input that drags first icon 410 which associated with the credit card account to third icon 430, end device 110 may be configured to receive or detect a touch input that drags at least one other icon (e.g., second icon 420), which is associated with at least one of a bank account, a credit card account, a debit card account, a reward points account, or a telephone payment service to third icon 430. End device 110 may be further configured to translate parameters of the received touch input into an asset transaction request that initiates a payment to point-of-sale terminal 150 associated with third icon 430 from the at least one of that bank account, credit card account, debit card account, reward points account, or telephone payment service associated with the at least one other icon.

End device 110 may be further configured to transmit, to service provider 120, the asset transaction request that includes the received point-of-sale terminal information and at least one of an account number of the bank account, a credit card account number, a debit card account number, reward points account information, or a device identifier or a telephone number assigned to end device 110, via the secured network channel between end device 110 and service provider 120.

Service provider 120 may be configured to request that asset transaction server 130 execute a payment to point-of-sale terminal 150 from the at least one of the bank account, credit card account, debit card account, reward points account, or telephone payment service, upon receiving the asset transaction request. Asset transaction server 130 may be configured to then execute a payment to point-of-sale terminal 150 with the at least one of the bank account, credit card account, debit card account, reward points account, or telephone payment service.

Thus, FIG. 4 shows yet another illustrative example of a system in which one or more embodiments of touch based asset transaction may be implemented.

Figure 5:
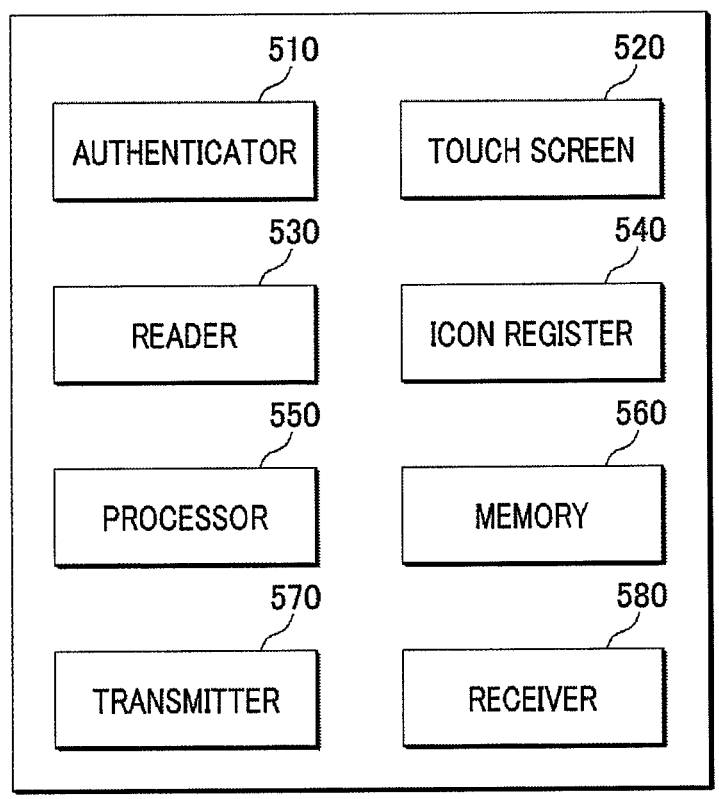
FIG. 5 shows an example configuration of an end device by which at least portions of touch based asset transaction may be implemented.

FIG. 5 shows an example configuration of an end device 110 by which at least portions of touch based asset transaction may be implemented. As depicted in FIG. 5, end device 110, which is described above with regard to FIGS. 1-4, may include an authenticator 510, a touch screen 520, a reader 530, an icon register 540, a processor 550, a memory 560, a transmitter 570 and a receiver 580. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of authenticator 510, touch screen 520, reader 530, icon register 540, processor 550, memory 560, transmitter 570 and receiver 580 may be included in an instance of an application hosted by end device 110.

Authenticator 510 may be configured to generate and authenticate a secured network channel between end device 110 and service provider 120. In some embodiments, authenticator 510 may be configured to transmit a unique identifier and a password or a secret key to service provider 120; and service provider 120 may be configured to authenticate end device 110 based on the unique identifier and password/secret key, so as to generate the secured network channel between end device 110 and service provider 120. By way of example, but not limitation, end device 110 and service provider 120 may be configured to perform a universal subscriber identity module (USIM) authentication.

Touch screen 520 may be configured to display multiple icons that are respectively associated with multiple asset transaction entities. By way of example, but not limitation, touch screen 520 may be configured to display multiple icons that are respectively associated with at least one of a bank account, a credit card account, a debit card account, a reward points account, a telephone payment service, automated teller machine 140, or point-of-sale terminal 150, etc.

Touch screen 520 may be further configured to receive or detect a touch input with respect to at least two icons among the displayed multiple icons. In some embodiments, touch screen 520 may be configured to receive or detect a touch input that drags one icon to another icon. As referenced here, dragging one icon to another icon may refer to dragging an icon to overlap, i.e., on top of, another icon; alternatively, dragging one icon to another icon may refer to dragging an icon to within a threshold distance, e.g., 1 mm, of another icon, depending on a scale of touch screen 520.

Touch screen 520 may be further configured to receive or detect an input regarding an amount of money to be treated/handled in an asset transaction between at least two asset transaction entities that are associated with the at least two icons for which an input has been received or detected. By way of example, touch screen 520 may receive or detect an input regarding an amount of a remittance from one bank account to another bank account, an input regarding an amount of a withdrawal from a bank account to automated teller machine 140, or an input regarding an amount of payment that is performed with regard to point-of-sale terminal 150 from a bank account or a credit card account.

Touch screen 520 may be further configured to display expressions of a result of the asset transaction.

In some embodiments, reader 530 may be configured to read ATM information from an electronic tag that may be attached to a surface of automated teller machine 140 or inserted in automated teller machine 140 as an electronic chip. In some other embodiments, reader 530 may be configured to read point-of-sale terminal information that may be attached to a surface of point-of-sale terminal 150 or inserted in point-of-sale terminal 150 as an electronic chip. By way of example, but not limitation, reader 530 may include a radio frequency identification reader, a near field communication reader, a barcode reader, a quick response code reader, etc. Further, the ATM information may include identification information of automated teller machine 140 such as a unique identifier of automated teller machine 140 or a serial number of automated teller machine 140 and the point-of-sale terminal information may include identification information of point-of-sale terminal 150 such as a unique identifier of point-of-sale terminal 150 or a serial number of point-of-sale terminal 150.

In some embodiments, reader 530 may be configured to read the ATM information via a wireless network between end device 110 and automated teller machine 140. Further, reader 530 may be configured to obtain the point-of-sale terminal information via a wireless network between end device 110 and point-of-sale terminal 150. By way of example, but not limitation, the wireless protocol may refer to at least one of a near field communication (NFC), Bluetooth, or peer to peer (P2P) communication protocol.

Icon register 540 may be configured to generate the multiple icons based on asset information regarding the multiple asset transaction entities. Non-limiting examples of the asset information regarding the multiple asset transaction entities may include a bank account number, a credit card number, a debit card number, a reward points account number, a telephone number assigned to end device 110 that is enabled to perform the telephone payment service, the read ATM information, or the read point-of-sale terminal information. By way of example, icon register 540 may be configured to generate the multiple icons by using any well-known graphic schemes or select each icon from among multiple icons that previously are generated and stored in a memory.

Processor 550 may be configured to translate parameters of the touch input received or detected by touch screen 520 into an asset transaction request that initiates execution of the asset transaction. In some embodiments, processor 550 may be configured to translate parameters of the touch input into an asset transaction request that initiates a remittance from the first bank account to the second bank account, when touch screen 520 receives or detects a touch input that drags a first bank icon which is associated with a first bank account to a second bank icon which is associated with a second bank account. In some embodiments, processor 550 may be configured to translate parameters of the touch input into an asset transaction request that initiates a withdrawal of money stored in the first bank account from automated teller machine 140, when touch screen 520 receives or detects a touch input that drags a first bank icon, which is associated with a first bank account, to an ATM icon, which is associated with automated teller machine 140. In some other embodiments, processor 550 may be configured to translate parameters of the touch input into an asset transaction request that initiates a payment to point-of-sale terminal 150 from the credit card account, when touch screen 520 receives or detects a touch input that drags a credit card icon which is associated with a credit card account to an POS icon which is associated with point-of-sale terminal 150.

Memory 560 may be configured to store the multiple icons that are respectively associated with multiple asset transaction entities. Further, memory 560 may be configured to store the asset information regarding the multiple asset transaction entities. Optionally, memory 560 may be further configured to pre-register and store information regarding the amount of money to be treated/handled in an asset transaction.

Transmitter 570 may be configured to transmit, to service provider 120, the asset transaction request and the asset information via a wireless network. Further, transmitter 570 may be configured to transmit the received input regarding the amount of money to be treated/handled in the asset transaction to service provider 120.

Receiver 580 may be configured to receive, from service provider 120, the asset information regarding the multiple asset transaction entities, which may be used to generate the multiple icons. Further, receiver 580 may be configured to receive, from service provider 120, the expressions of the result of the asset transaction.

Thus, FIG. 5 shows an example configuration of an end device 110 by which at least portions of touch based asset transaction may be implemented.

Figure 6:
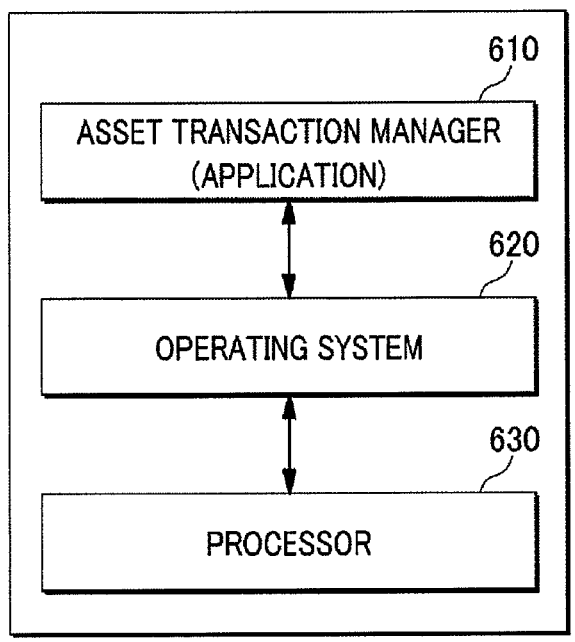
FIG. 6 shows still another example configuration of an end device by which at least portions of touch based asset transaction may be implemented.

FIG. 6 shows still another example configuration of an end device 110 by which at least portions of touch based asset transaction may be implemented. As depicted, end device 110, which is described above with regard to FIGS. 1-5, may include asset transaction manager 610, an operating system 620 and a processor 630.

Asset transaction manager 610 may be an application adapted to operate on operating system 620 such that the touch based asset transacting schemes as described herein may be provided.

Operating system 620 may allow asset transaction manager 610 to manipulate processor 630 to implement the touch based asset transacting schemes as described herein.

Figure 7:
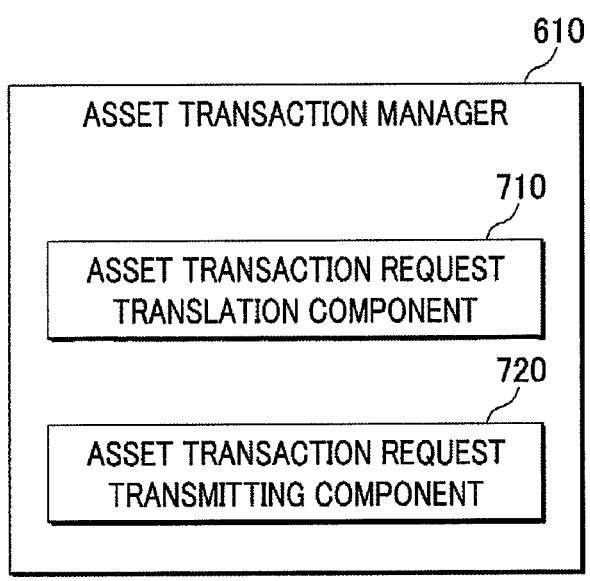
FIG. 7 shows an example configuration of an asset transaction manager by which at least portions of touch based asset transaction may be implemented.

FIG. 7 shows an example configuration of an asset transaction manager 610 by which at least portions of touch based asset transaction may be implemented. As depicted, asset transaction manager 610 may include an asset transaction request translating component 710 and an asset transaction request transmitting component 720.

Asset transaction request translating component 710 may be configured to translate parameters of a touch input with respect to at least two icons that are associated with at least two asset transaction entities into an asset transaction request that initiates execution of an asset transaction between the at least two asset transaction entities.

In some embodiments, asset transaction request translating component 710 may be configured to translate parameters of the touch input into an asset transaction request that initiates a remittance from the first bank account to the second bank account, when end device 110 receives or detects a touch input that drags a first bank icon which is associated with a first bank account to a second bank icon which is associated with a second bank account. In some other embodiments, asset transaction request translating component 710 may be configured to translate parameters of the touch input into an asset transaction request that initiates a withdrawal of money stored in the first bank account from automated teller machine 140, when end device 110 receives a touch input that drags a first bank icon which is associated with a first bank account to an ATM icon which is associated with automated teller machine 140. In still some other embodiments, asset transaction request translating component 710 may be configured to translate parameters of the touch input into an asset transaction request that initiates a payment to point-of-sale terminal 150 from a credit card account, when end device 110 receives or detects a touch input that drags a credit card icon which is associated with the credit card account to an POS icon which is associated with point-of-sale terminal 150.

Asset transaction request transmitting component 720 may be configured to transmit the asset transaction request and asset information regarding multiple asset transaction entities to service provider 120 via a wireless network. Non-limiting examples of the asset information regarding the multiple asset transaction entities may include a bank account number, a credit card number, a debit card number, a reward points account number, a telephone number assigned to end device 110 which is enabled to perform a telephone payment service, ATM information, or point-of-sale terminal information.

Thus, FIG. 6 shows still another example configuration of an end device 110 by which at least portions of touch based asset transaction may be implemented, and FIG. 7 shows an example configuration of an asset transaction manager 610 by which at least portions of touch based asset transaction may be implemented.

Figure 8:
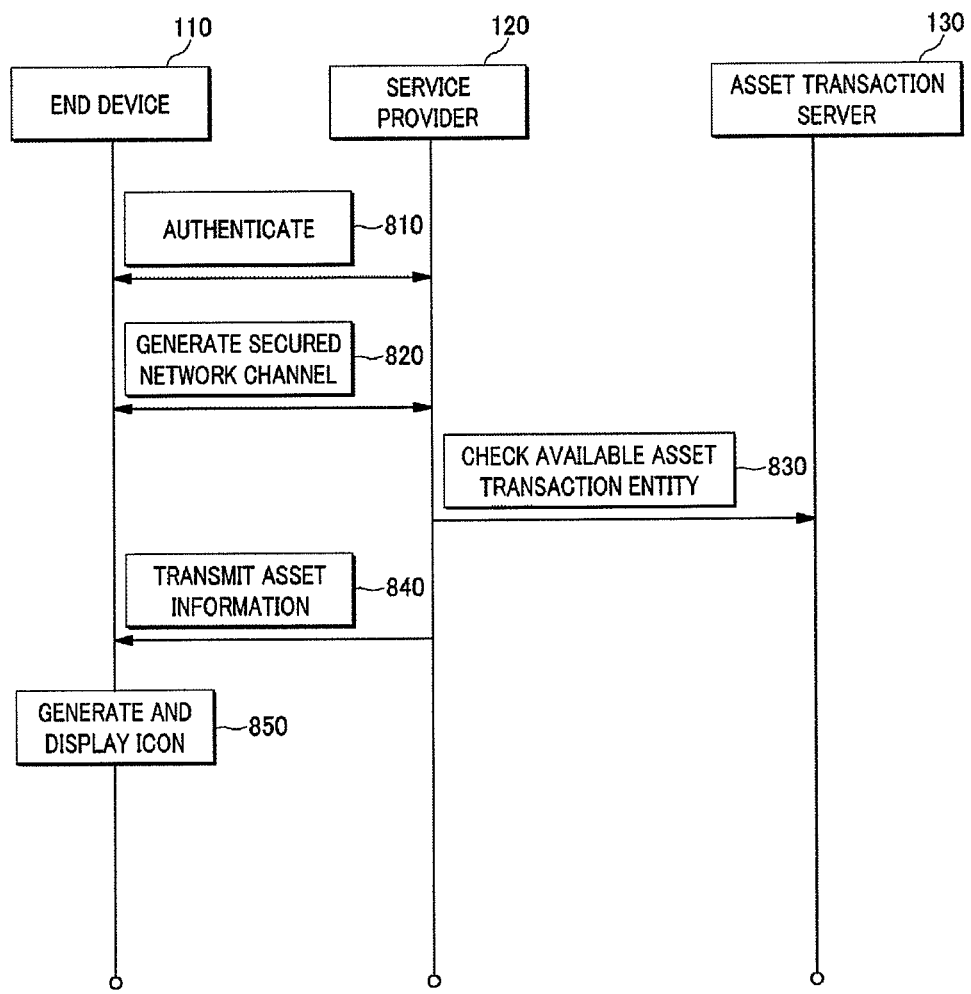
FIG. 8 shows an example processing flow of operations for implementing at least portions of generating and displaying icons.

FIG. 8 shows an example processing flow of operations for implementing at least portions of generating and displaying icons. The operations in FIG. 8 may be implemented in system configuration 100 including end device 110, service provider 120 and asset transaction server 130, as described with reference to FIG. 1. An example process may include one or more operations, actions, or functions as illustrated by one or more blocks 810, 820, 830, 840 and/or 850. Although illustrated as discrete blocks, various blocks may be divided into additional blocks, combined into fewer blocks, or eliminated, depending on the desired implementation. Processing may begin at block 810.

Block 810 (Authenticate) may refer to end device 110 performing an authenticating process with regard to service provider 120. In some embodiments, end device 110 may transmit a unique identifier and a password or a secret key to service provider 120, and service provider 120 may authenticate end device 110 based on the unique identifier and password/secret key. By way of example, block 810 may refer to end device 110 and service provider 120 performing a universal subscriber identity module (USIM) authentication. Processing may proceed from block 810 to block 820.

Block 820 (Generate Secured Network Channel) may refer to end device 110 and service provider 120 generating a secured network channel between end device 110 and service provider 120 as a result of the authentication which is performed at block 810. Processing may proceed from block 820 to block 830.

Block 830 (Check Available Asset Transaction Entity) may refer to service provider 120 checking, or confirming, with regard to asset transaction server 130, which asset transaction entity of a user of end device 110 is available. Processing may proceed from block 830 to block 840.

Block 840 (Transmit Asset Information) may refer to service provider 120 transmitting the check result at block 830 to end device 110. That is, service provider 120 may be configured to transmit asset information regarding available multiple asset transaction entities to end device 110. Non-limiting examples of the asset information may include a bank account number, a credit card number, a debit card number, a reward points account number, or a telephone number assigned to end device 110, which may be enabled to perform a telephone payment service. Processing may proceed from block 840 to block 850.

Block 850 (Generate and Display Icons) may refer to end device 110 generating multiple icons that are associated with the available multiple asset transaction entities based on the received asset information. By way of example, end device 110 may be configured to generate the multiple icons by using any well-known graphic schemes or select each icon from among multiple icons that previously are generated and stored in a memory. Further, at block 850, end device 110 may be configured to display the generated multiple icons on a touch screen coupled to end device 110.

Thus, FIG. 8 shows an example processing flow of operations for implementing at least portions of generating and displaying icons.

Figure 9:
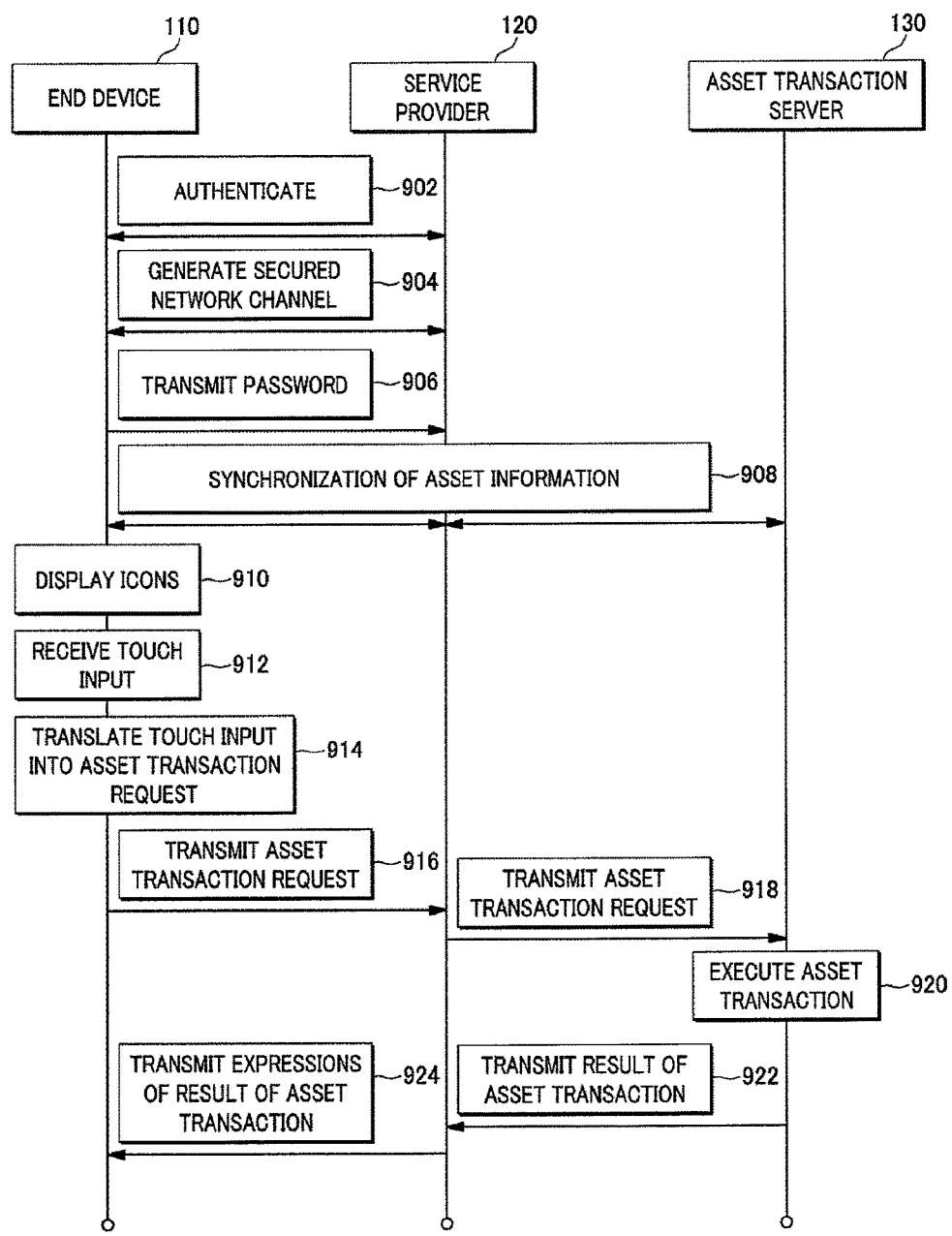
FIG. 9 shows an example processing flow of operations for implementing at least portions of touch based asset transaction.

FIG. 9 shows an example processing flow of operations for implementing at least portions of touch based asset transaction. The operations in FIG. 9 may be implemented in system configuration 100 including end device 110, service provider 120 and asset transaction server 130, as described with regards to FIG. 1. An example process may include one or more operations, actions, or functions as illustrated by one or more blocks 902, 904, 906, 908, 910, 912, 914, 916, 918, 920, 922 and/or 924. Although illustrated as discrete blocks, various blocks may be divided into additional blocks, combined into fewer blocks, or eliminated, depending on the desired implementation. Processing may begin at block 902.

Block 902 (Authenticate) may refer to end device 110 performing an authenticating process with regard to service provider 120. In some embodiments, end device 110 may be configured to transmit a unique identifier and a password or a secret key to service provider 120, and service provider 120 may authenticate end device 110 based on the unique identifier and password/secret key. By way of example, block 902 may refer to end device 110 and service provider 120 performing a universal subscriber identity module (USIM) authentication. Processing may proceed from block 902 to block 904.

Block 904 (Generate Secured Network Channel) may refer to end device 110 and service provider 120 generating a secured network channel between end device 110 and service provider 120 as a result of the authentication which is performed at block 902. Processing may proceed from block 904 to block 906.

Block 906 (Transmit Password) may refer to end device 110 transmitting a password to service provider 120. The password may be pre-registered between end device 110 and service provider 120, by an owner or entity that exercises control over end device 110, to receive expressions of an asset transaction service from service provider 120. Service provider 120 may identify and authenticate the owner or entity that exercises control over end device 110 based on the received password. Processing may proceed from block 906 to block 908.

Block 908 (Synchronize of Asset Information) may refer to service provider 120 synchronizing asset information managed by service provider 120 with asset information managed by asset transaction server 130. By way of example, service provider 120 may receive information regarding a current bank balance of a bank account or remaining reward points from asset transaction server 130 and update the asset information regarding the multiple asset transaction entities. Block 908 may further refer to service provider 120 transmitting the updated asset information to end device 110. Processing may proceed from block 908 to block 910.

Block 910 (Display Icons) may refer to end device 110 displaying multiple icons associated with the multiple asset transaction entities on a touch screen coupled to end device 110. Processing may proceed from block 910 to block 912.

Block 912 (Receive Touch Input) may refer to end device 110 receiving or detecting a touch input with respect to at least two icons among the displayed multiple icons. In some embodiments, end device 110 may receive or detect a touch input that drags one icon to another icon. Processing may proceed from block 912 to block 914.

Block 914 (Translate Touch Input into Asset Transaction Request) may refer to end device 110 translating parameters of the touch input received at block 912 into an asset transaction request that initiates execution of an asset transaction between at least two asset transaction entities that are associated with the received or detected touch of at least two icons. By way of example, but not limitation, when end device 110 receives a touch input that drags a first bank icon, which is associated with a first bank account, to a second bank icon, which is associated with a second bank account at block 912, end device 110 may translate parameters of the touch input into an asset transaction request that initiates a remittance from the first bank account to the second bank account. Processing may proceed from block 914 to block 916.

Block 916 (Transmit Asset Transaction Request) may refer to end device 110 transmitting the asset transaction request to service provider 120 via a wireless network. The asset transaction request may include asset information regarding the at least two asset transaction entities which are associated with the touch at least two icons, such as a bank account number, a credit card number, a debit card number, a reward points account number, a telephone number assigned to end device 110 which is enabled to perform a telephone payment service. Processing may proceed from block 916 to block 918.

Block 918 (Transmit Asset Transaction Request) may refer to service provider 120 transmitting, to asset transaction server 130, the asset transaction request and the asset information that are received from end device 110 at block 916. Processing may proceed from block 918 to block 920.

Block 920 (Execute Asset Transaction) may refer to asset transaction server 130 executing an asset transaction between the at least two asset transaction entities in response to the receipt of the asset transaction request based on the asset information received from service provider 120 at block 918. By way of example, but not limitation, asset transaction server 130 may remit some amounts of money from the first bank account to the second bank account based on first bank account and the second bank account. Processing may proceed from block 920 to block 922.

Block 922 (Transmit Result of Asset Transaction) may refer to asset transaction server 130 notifying and transmitting a result of the asset transaction executed at block 920 to service provider 120. Processing may proceed from block 922 to block 924.

Block 924 (Transmit Expressions of Result of Asset Transaction) may refer to service provider 120 transmitting one or more expressions of the result of the asset transaction to end device 110. End device 110 may be configured to receive or detect the one or more expressions of the result of the asset transaction and display them on the touch screen coupled to end device 110.

Thus, FIG. 9 shows an example processing flow of operations for implementing at least portions of touch based asset transaction.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
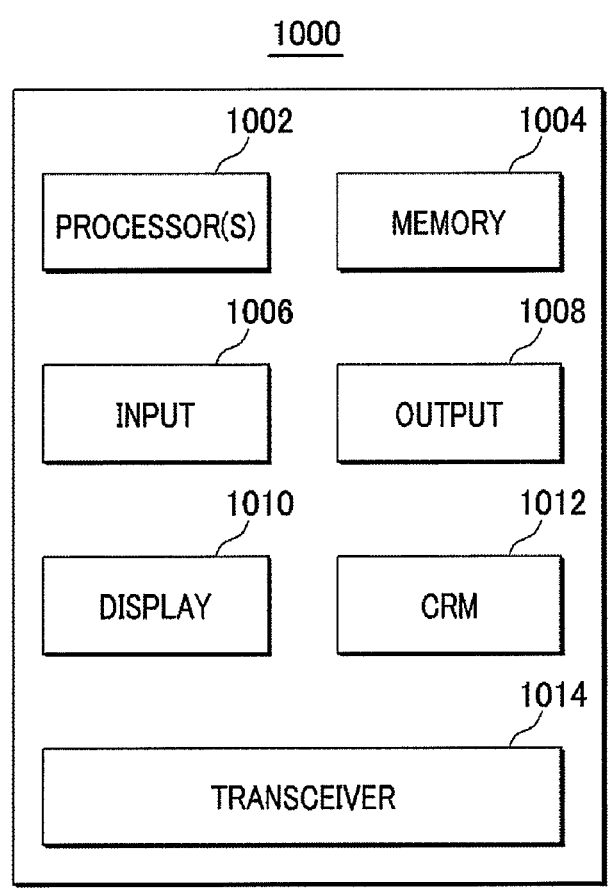
FIG. 10 shows an illustrative computing embodiment, in which any of the processes and sub-processes of touch based asset transaction may be implemented as computer-readable instructions stored on a computer-readable medium.

FIG. 10 shows an illustrative computing embodiment, in which any of the processes and sub-processes of touch based asset transaction may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1000 may typically include, at least, one or more processors 1002, a system memory 1004, one or more input components 1006, one or more output components 1008, a display component 1010, a computer-readable medium 1012, and a transceiver 1014.

Processor 1002 may refer to, e.g., a microprocessor, a microcontroller, a digital signal processor, or any combination thereof.

Memory 1004 may refer to, e.g., a volatile memory, non-volatile memory, or any combination thereof. Memory 1004 may store, therein, an operating system, an application, and/or program data. That is, memory 1004 may store executable instructions to implement any of the functions or operations described above and, therefore, memory 1004 may be regarded as a computer-readable medium.

Input component 1006 may refer to a built-in or communicatively coupled keyboard, touch screen, or telecommunication device. Alternatively, input component 1006 may include a microphone that is configured, in cooperation with a voice-recognition program that may be stored in memory 1004, to receive voice commands from a user of computing device 1000. Further, input component 1006, if not built-in to computing device 1000, may be communicatively coupled thereto via short-range communication protocols including, but not limitation, radio frequency or Bluetooth.

Output component 1008 may refer to a component or module, built-in or removable from computing device 1000, that is configured to output commands and data to an external device.

Display component 1010 may refer to, e.g., a solid state display that may have touch input capabilities. That is, display component 1010 may include capabilities that may be shared with or replace those of input component 1006.

Computer-readable medium 1012 may refer to a separable machine readable medium that is configured to store one or more programs that embody any of the functions or operations described above. That is, computer-readable medium 1012, which may be received into or otherwise connected to a drive component of computing device 1000, may store executable instructions to implement any of the functions or operations described above. These instructions may be complimentary or otherwise independent of those stored by memory 1004.

Transceiver 1014 may refer to a network communication link for computing device 1000, configured as a wired network or direct-wired connection. Alternatively, transceiver 1014 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A system, comprising:
   an end device, comprising:
   a reader configured to read automated teller machine (ATM) information received from an ATM,
   wherein the reader is at least one of a radio frequency identification reader, a near field communication reader, a barcode reader, or a quick response code reader,
   an icon register configured to generate a plurality of icons based on asset information regarding a plurality of asset transaction entities, the plurality of icons including an icon that is associated with an ATM based on the read ATM information,
   a touch screen configured to:
   display the plurality of icons including the icon that is associated with the ATM and a first icon that is associated with a first asset transaction entity among the plurality of asset transaction entities,
   receive a touch input with respect to at least two icons among the plurality of icons, wherein the at least two icons includes the icon that is associated with the ATM and the first icon, and receive an input regarding an amount of a withdrawal to be executed by the ATM, a processor configured to translate the touch input into an asset transaction request that initiates execution of an asset transaction between at least two asset transaction entities among the plurality of asset transaction entities that are respectively associated with the at least two touched icons, the asset transaction request including the amount of the withdrawal, wherein the asset transaction includes a payment from an account associated with the first transaction entity to an account corresponding to the ATM, and a transmitter configured to transmit the asset transaction request, including the amount of the withdrawal, to a service provider, wherein the touch screen is configured to receive the touch input that drags the first icon to the icon that is associated with the ATM;

the service provider, to which the end device is securely authenticated on a secured network channel, the service provider configured to receive from the end device, and transmit to the ATM, the asset transaction request;

an asset transaction server configured to manage the asset information regarding the plurality of asset transaction entities including the ATM information; and the ATM identified by the ATM information, wherein the ATM is one of the at least two asset transaction entities, and wherein the icon that is associated with the ATM is one of the at least two touched icons, and the ATM executing a withdrawal of money in the amount included in the asset transaction request, wherein the service provider is further configured to synchronize the asset information between the service provider and the asset transaction server, and transmit updated asset information to the end device.

2. The system of claim 1, wherein the plurality of asset transaction entities includes at least one of a bank account, a credit card account, a debit card account, a reward points account, a telephone payment service, or a point-of-sale terminal.

3. The system of claim 1, wherein the touch screen is further configured to receive an input regarding a payment amount, and wherein the transmitter is further configured to transmit the received input regarding the payment amount to the service provider.

4. The system of claim 1, further comprising:

a receiver configured to receive, from the service provider, the asset information regarding the plurality of asset transaction entities.

5. The system of claim 1, further comprising:

an authenticator configured to generate and authenticate the secured network channel between the end device and the service provider, and wherein the transmitter is further configured to transmit the asset transaction request to the service provider via the secured network channel.

6. A method, comprising:

displaying, by an end device, a plurality of icons that are associated with a plurality of asset transaction entities, wherein the plurality of icons includes a icon that is associated with an automated teller machine (ATM) and a first icon that is associated with a first asset transaction entity among the plurality of asset transaction entities;

receiving, by the end device, a touch input with respect to at least two icons among the plurality of icons, wherein the at least two touched icons includes the icon that is associated with the ATM and the first icon, and the received touch input drags a first one of the touched icons to the icon that is associated with the ATM;

receiving, by the end device, an input regarding an amount of a withdrawal to be executed by the ATM;

translating, by the end device, the touch input into an asset transaction request that initiates execution of an asset transaction between at least one of asset transaction entities that is associated with the other of the at least two touched icons and a bank associated with the ATM among the plurality of asset transaction entities, wherein the asset transaction includes a payment from an account associated with the first transaction entity to an account corresponding to the ATM;

reading, by the end device using a reader coupled to the end device, ATM information received from the ATM to which the end device is communicatively coupled, wherein the reader is at least one of a radio frequency identification reader, a near field communication reader, a barcode reader, or a quick response code reader;

wherein the plurality of icons are generated, by the end device, based on asset information regarding the plurality of asset transaction entities and the icon associated with the ATM is generated based on the read ATM information;

transmitting, by the end device, the asset transaction request, including the amount of the withdrawal, to a service provider to which the end device is securely authenticated;

instructing, by the service provider, a withdrawal of money from the ATM in accordance with the asset transaction request;

dispensing, by the ATM, currency in the amount included in the asset transaction request;

managing, by an asset transaction server, the asset information regarding the plurality of asset transaction entities including the ATM information;

synchronizing, by the service provider, the asset information between the service provider and the asset transaction server; and transmitting, by the service provider, updated asset information to the end device.

7. The method of claim 6, wherein the displaying includes displaying a first icon from the plurality of icons that is associated with a first bank account, wherein the translating includes translating the touch input into the asset transaction request that initiates a remittance from the first bank account to be withdrawn from the ATM, and wherein the transmitting includes transmitting, to the service provider, the asset transaction request including a first account number of the first bank account.

8. The method of claim 6, further comprising:

the end device receiving, from the service provider, the asset information regarding the plurality of asset transaction entities.

9. The method of claim 6, further comprising:

the end device generating and authenticating a secured network channel between the end device and the service provider, and wherein the transmitting of the asset transaction request is performed via the secured network channel.

* * * * *